(12) United States Patent
Chambers et al.

(10) Patent No.: US 10,175,068 B2
(45) Date of Patent: Jan. 8, 2019

(54) PRESSURE COMPENSATOR FOR METER HOUSING

(71) Applicant: Polaris Industries Inc., Medina, MN (US)

(72) Inventors: Benjamin T. Chambers, Medina, MN (US); Geoffrey Wotton, Medina, MN (US); Justin Larson, Medina, MN (US)

(73) Assignee: Polaris Industries Inc., Medina, MN (US)

( * ) Notice: Subject to any disclaimer, the term of this patent is extended or adjusted under 35 U.S.C. 154(b) by 20 days.

(21) Appl. No.: 14/937,946

(22) Filed: Nov. 11, 2015

(65) Prior Publication Data
US 2017/0010134 A1     Jan. 12, 2017

Related U.S. Application Data

(60) Provisional application No. 62/190,433, filed on Jul. 9, 2015.

(51) Int. Cl.
*F16K 15/14*     (2006.01)
*G01D 11/24*     (2006.01)
(Continued)

(52) U.S. Cl.
CPC ............ *G01D 11/245* (2013.01); *B60K 37/02* (2013.01); *B65D 25/20* (2013.01); *B60K 2350/2073* (2013.01); *G01D 11/24* (2013.01)

(58) Field of Classification Search
CPC ...... F16K 15/147; G01D 11/245; B60K 37/02
See application file for complete search history.

(56) References Cited

U.S. PATENT DOCUMENTS 3,677,248 A * 7/1972 McPhee ............... A61M 3/0241
                                                        137/127
3,896,849 A * 7/1975 Ervin .................... F16K 15/147
                                                        137/847
(Continued)

FOREIGN PATENT DOCUMENTS

DE        89 14 781 U1     2/1990
JP        H09 263232       10/1997
JP        2000208948       7/2000

OTHER PUBLICATIONS

International Search Report and Written Opinion issued by the International Searching Authority, dated Oct. 4, 2016 for corresponding International Application No. PCT/US2016/041721, 11 pages.

(Continued)

*Primary Examiner* — Andrew T Kirsch
(74) *Attorney, Agent, or Firm* — Faegre Baker Daniels LLP

(57) ABSTRACT

Disclosed is a pressure compensator for a housing compartment that includes a housing wall that has an opening between an interior zone that is inside of the compartment and an exterior zone that is outside of the compartment. The housing wall also includes an annulus that defines one portion of the opening. A seal engages the annulus and is seated in the opening to seal the opening, the seal including a flexible diaphragm having a normally closed slit therethrough. The seal is configured so that the diaphragm is normally compressed in a first direction that urges the slit closed when the seal is engaged with the annulus. The diaphragm is arranged so that a pressure difference between the interior zone and exterior zone urges the diaphragm to flex in a direction for opening a slit thus creates a pathway between the interior zone and the exterior zone, thereby reducing the pressure difference.

13 Claims, 5 Drawing Sheets

(51) Int. Cl.
*B60K 37/02* (2006.01)
*B65D 25/20* (2006.01)

(56) References Cited

U.S. PATENT DOCUMENTS

| | | | |
|---|---|---|---|
| 6,533,254 B1 * | 3/2003 | Grifka | F02M 1/16 |
| | | | 123/179.11 |
| 6,951,295 B1 | 10/2005 | Gaus | |
| 8,419,830 B2 | 4/2013 | Masetto | |
| 8,430,442 B2 | 4/2013 | Utke | |
| 8,543,306 B2 | 9/2013 | Utke | |
| 8,930,109 B2 | 1/2015 | Utke | |
| 9,080,514 B2 | 7/2015 | Utke | |
| 2008/0116157 A1 * | 5/2008 | Fulbrook | A61M 5/1415 |
| | | | 211/60.1 |
| 2009/0029641 A1 | 1/2009 | Furuuchi | |
| 2010/0076366 A1 | 3/2010 | Henderson | |
| 2017/0010134 A1 | 1/2017 | Chambers et al. | |

OTHER PUBLICATIONS

International Search Report and Written Opinion issued by the International Searching Authority, dated Jun. 27, 2018 for corresponding International Application No. PCT/US2018/024830, 16 pages.

\* cited by examiner

PRESSURE COMPENSATOR FOR METER HOUSING

FIELD OF THE INVENTION

This invention relates to a way of compensating for pressure changes that affect a sealed compartment, such as the interior of a motorcycle meter or the like.

BACKGROUND AND SUMMARY OF THE INVENTION

Meters used on motorcycles include digital displays of, for example, running time, engine temperature and other information. Since the motorcycles may be of the trail-type for traversing rough terrain, the meters must be robust to withstand vibration and shock. The meters must also be well sealed to prevent penetration of fine dust and moisture into the meter. For convenience, the interior of the meter housing that includes the electronic and other components and that is intended to be protected from penetration of dust and moisture will be referred to as the meter compartment, or simply "compartment."

In the past, the technique for sealing the meter compartment included a small, passive vent that enabled filtered air to pass into and out of compartment. Thus, the pathway between the compartment and ambient air is continuously open, and the filter is relied upon for preventing penetration of fine particles. The continuously open air pathway compensates for changes in ambient pressure by permitting air flow between the compartment to equalize pressure inside and outside of the meter. In such a design, it is important that the vent also prevents the passage of moisture into the compartment while allowing the pressure-equalizing air flow. To this end, porous hydrophobic material is often selected for use as vent's filter, which spans an opening or passage into the compartment. Such material is not, however, completely effective, and over time the continuously open venting approach will enable moisture to accumulate within the meter compartment, which leads to corrosion and other problems, including fogging of the meter display when the moisture condenses on it.

One prior solution to the forgoing problem is to place a package of desiccant material within the compartment, but this merely delays the problem for as long as it takes for the desiccant to saturate.

Completely sealing the compartment (that is, eliminating the continuously open vent) is not a practical option because large changes in ambient pressure, such as pressure drops occurring when meters are shipped by air or otherwise transported to high-elevations, can lead to failure of the compartment water seals and/or distortion of the display and other components.

The present invention is directed to a solution to the forgoing problem and provides, among other things, a way of compensating for the pressure changes affecting sealed compartments by eliminating the prior art, continuously open pathway between ambient air and the compartment interior, while occasionally and briefly opening the pathway to prevent damage from extreme pressure differences.

Other advantages and features of the present invention will become clear upon study of the following portion of this specification and drawings.

DETAILED DESCRIPTION

Figure 1:
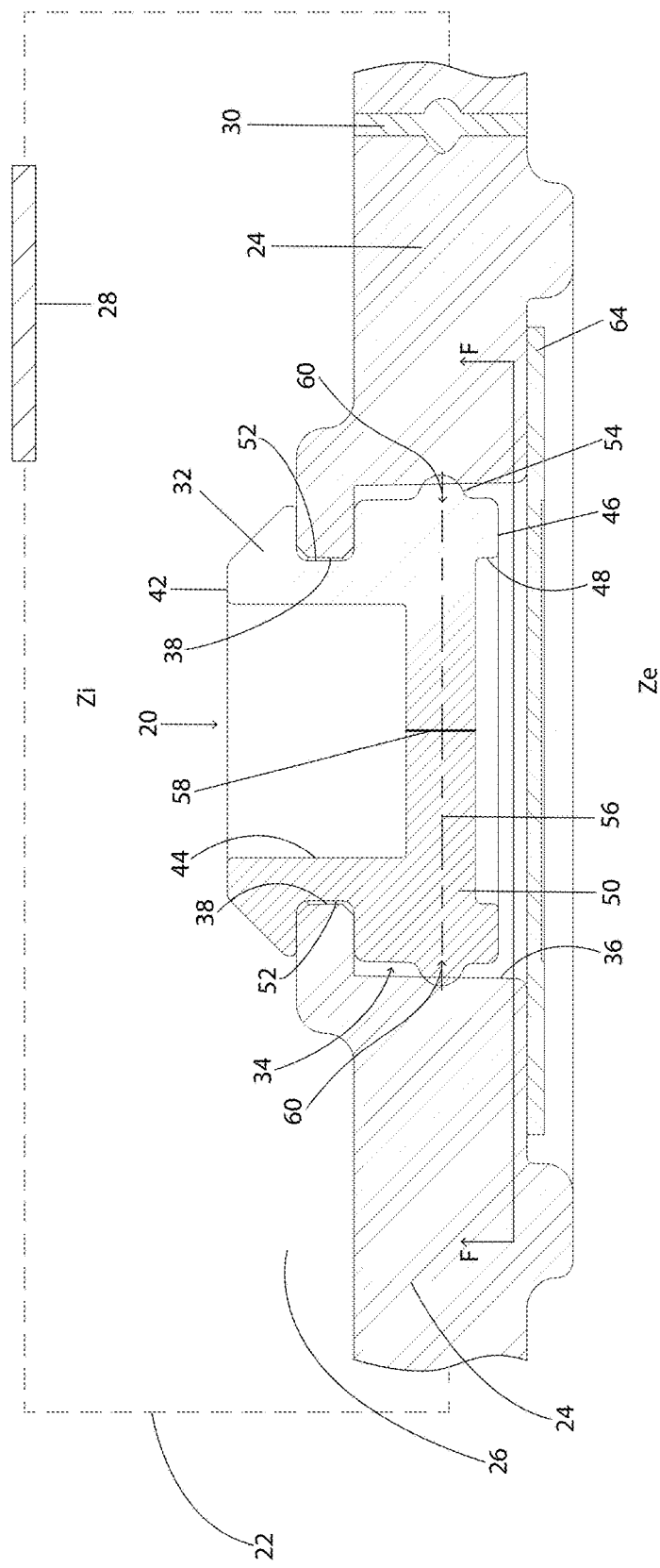
FIG. 1 is a diagram of a meter, including a cross section view of a portion of the meter that includes a preferred embodiment of a pressure compensator apparatus of the present invention.
Figure 2:
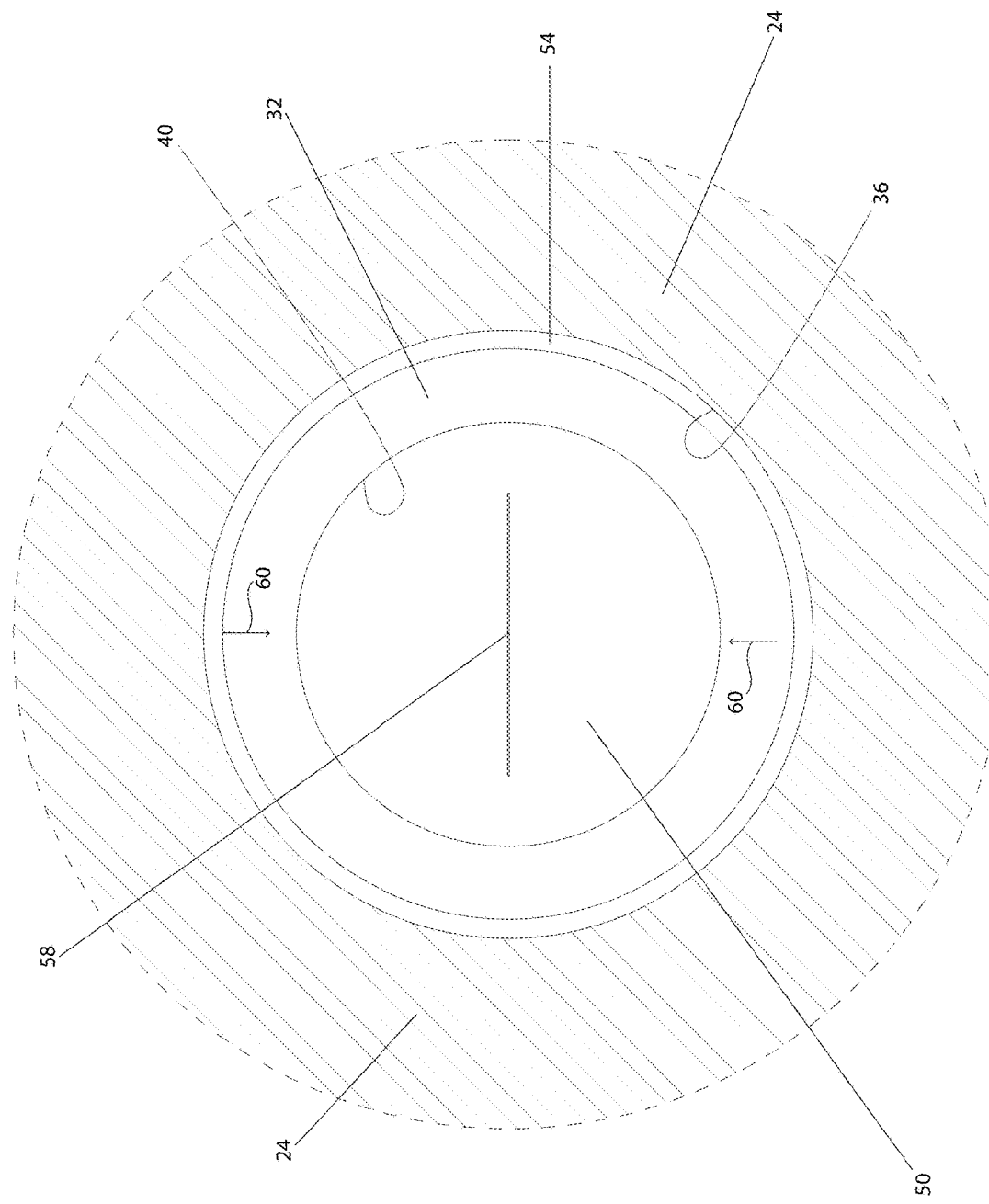
FIG. 2 is a section view, taken along line F-F of FIG. 1.
Figure 3:
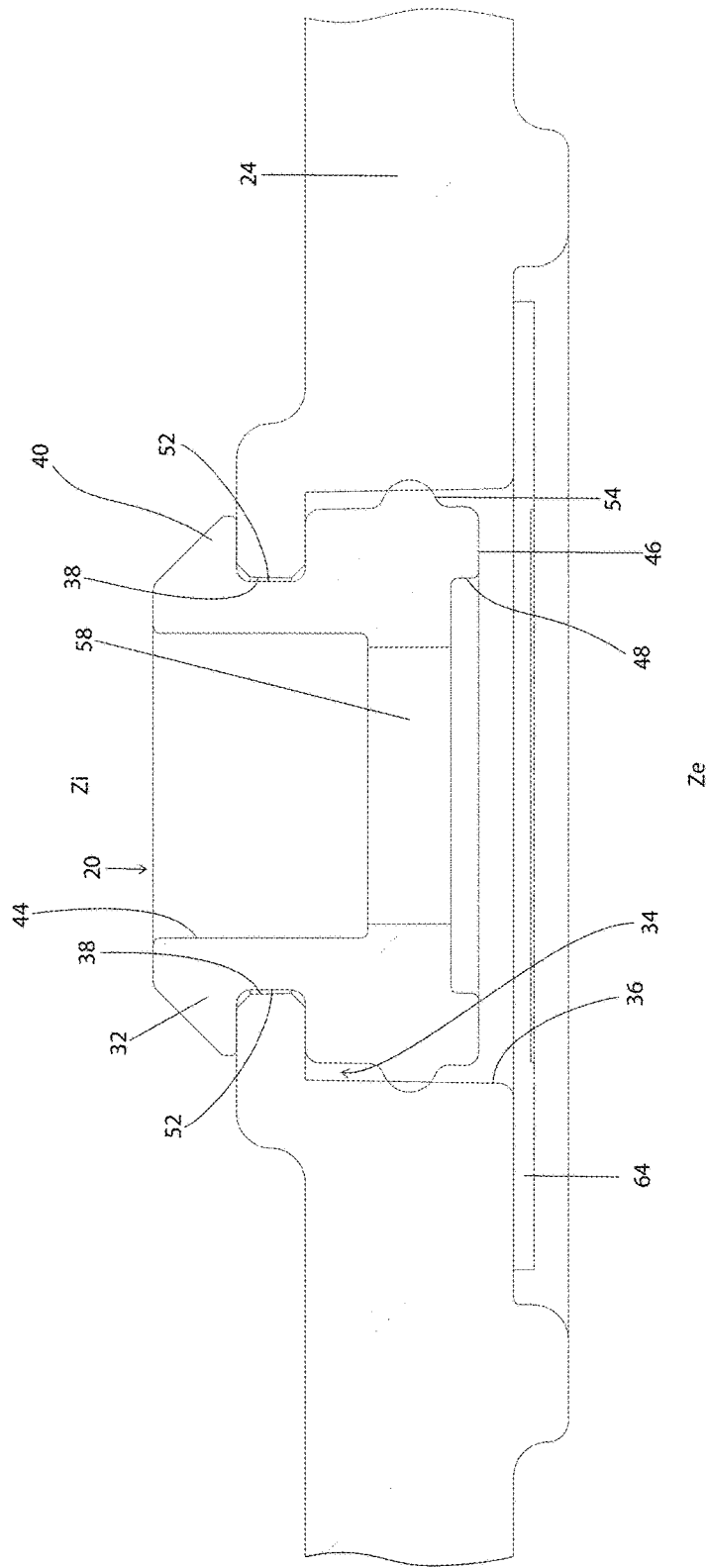
FIG. 3 is a cross section view, like FIG. 1 but rotated by 90 degrees about a horizontal centerline.

FIGS. 1-4 show a preferred embodiment of a pressure compensator apparatus 20 formed in accordance with the present invention. In this embodiment, the apparatus 20 is incorporated into the housing of a meter that is used on a motorcycle and that includes a digital displays of, for example, running time, engine temperature and other information. Since the motorcycle may be of the trail-type for traversing rough terrain, the meter must be robust to withstand vibration and shock. The meter must also be well sealed to prevent penetration of fine dust and moisture into the meter. The apparatus may be incorporated into any of a variety of housings, including those that house light sources for headlights etc.

The figures depict a portion of the meter that includes a housing that generally comprises a housing wall 24 inside of which forms a compartment 26 that encloses the meter electronic components (not shown). The housing also includes a transparent part that serves as a window 28 for the meter display. One can consider the compartment as having an interior zone "Zi" that is sealed from the space surrounding it, which surrounding space can be considered as an exterior zone "Ze" which in most cases would be ambient air. The housing 22 is assembled from pieces that are joined and sealed (an exemplary wall seal being depicted at 30 in FIG. 1) to keep the interior zone Zi separate and sealed from the exterior zone Ze.

The pressure compensating apparatus 20 of the current invention is part of or attached to the housing 22 for compensating for the pressure changes affecting the sealed compartment 26 without the presence of a continuously open pathway between the interior zone Zi and exterior zone Ze. As will become clear, the apparatus 20 includes a seal 32 for normally closing an opening 34 in the housing between the interior zone Zi and exterior zone Ze. In one embodiment, the opening 34 includes a counterbored hole in the housing wall 24 that forms a counterbored portion 36 of the opening that is adjacent to a relatively smaller diameter portion of the opening that is formed by a radially inwardly protruding annulus 38. The seal 32 is formed of flexible material, such as silicone rubber and seats in the opening 34, primarily by engaging the annulus 38.

The seal 32 is somewhat cup-shaped, having a generally cylindrical sidewall 40, and an inner side 42 that is open to a central aperture 44 in the seal. The outer side 46 of the seal 32 includes a shallow, round outer recess 48 formed therein, and between that recess 48 and the aperture 44 there is formed a flexible diaphragm 50 that is configured to bow or flex inwardly and outwardly in response to pressure differences between the interior zone Zi and exterior zone Ze, as will be discussed more below.

The seal 32 engages the annulus 38 via a peripheral groove 52 formed in the seal sidewall 40 and sized to snugly engage the annulus (FIG. 1). When so engaged, the seal sidewall 40 of this embodiment extends outwardly (from the interior zone Zi) to protrude into the counterbored portion 36 of the opening 34. Here the seal sidewall 40 includes a peripheral, radially protruding rib 54 that can be, for example, semi-circular in cross section. The rib 54 surrounds an imaginary central plane 56 (FIG. 1, dashed lines) of the diaphragm when the diaphragm is in a normal or relaxed orientation, as would occur when there is no significant difference in pressure between the interior zone Zi and exterior zone Ze. The outside diameter of the rib 54 is slightly larger than the diameter of the counterbored portion 36 of the opening 34 and, therefore, the portion of the seal 32, including diaphragm 50 is slightly compressed when the seal is installed as shown in FIG. 1.

The diaphragm 50 is provided with a very thin, central linear slit 58 extending through it. The slit 58 is preferably made prior to installation of the seal, and once in place, the slight compressive force attributable to the compressed rib portion of the seal and that acts across the width of the slit 58 (that force illustrated with arrows 60 in FIG. 2) urges the slit closed. Alternatively, the slit 58 may be made after the seal 32 is installed.

Whenever there develops a pressure difference between the interior zone Zi and exterior zone Ze, as might occur, for example, when the meter is transported to a relatively high-altitude location, the diaphragm 50 is able to flex or bow out of its normal, equal pressure or relaxed orientation (FIG. 1). A drop in the pressure of exterior zone Ze will cause the diaphragm to bow outwardly, which changes (here, increasing) the volume of the interior zone Zi, which has the effect of reducing the pressure in that zone to thereby compensate slightly for the pressure drop occurring in the exterior zone Ze.

Figure 4:
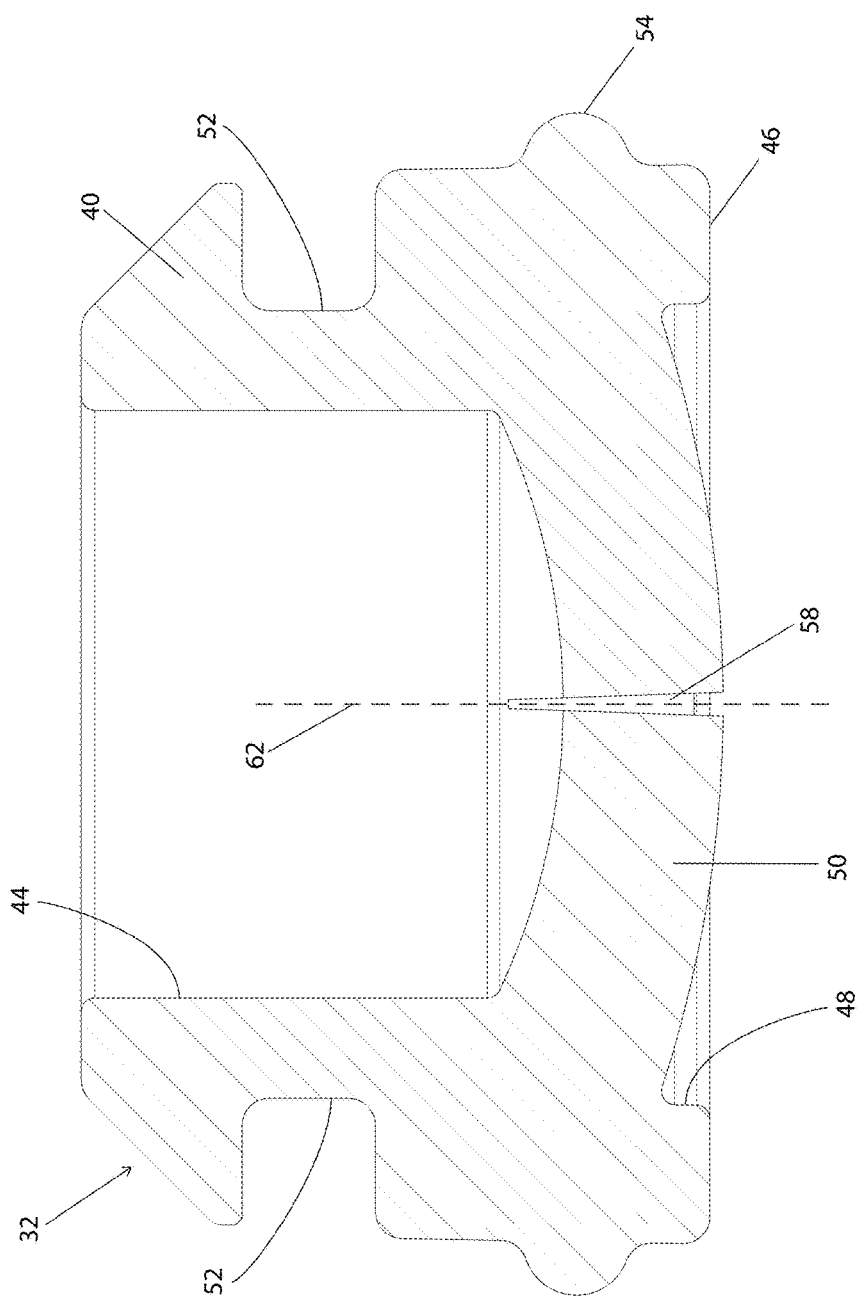
FIG. 4 is an enlarged cross section view of the seal component of the pressure compensator apparatus of FIG. 1, showing operation of a diaphragm component of the seal.

In instances where the pressure difference or differential between the interior zone Zi and exterior zone Ze becomes extreme, the diaphragm will bow out (or in, should the exterior zone pressure be greater than the interior zone pressure) by an amount that is sufficient to cause the slit 58 to open slightly as illustrated in FIG. 4. Such extreme pressure differentials may occur, for example, when the meter is shipped via air transport. It will be appreciated that during the brief time that the slit 58 is open, there is provided an open pathway 62 for air to move from the higher pressure zone Zi to the lower pressure zone Ze, thereby reducing the pressure differential between the two zones. The differential will reduce until the resilience of the diaphragm overcomes the remaining pressure differential and closes the slit 58. That is, the resilience of the diaphragm will urge the diaphragm back toward the normal position (FIG. 1) for closing the slit 58.

When the slit briefly opens as just described, there is an opportunity for moisture to enter the compartment. Preferably, the pressure compensator 20 is supplemented with a porous hydrophobic filter 64 that is attached to the housing wall 24 adjacent to the outer side 46 of the seal 32 to cover the opening as shown in FIG. 1, for example. Alternatively, the filter 64 could be attached adjacent to the inner side 42 of the seal, although the outer side attachment is preferred for the purpose of preventing debris from contacting the seal.

The filter prevents moisture and fine particles from moving into the compartment during the brief time that the pathway 62 is open. In this regard, it is contemplated that the filter 64 is optional since most pressure differences between the interior zone Zi and exterior zone Ze will not be so extreme as to cause the slit to open, the opening may be covered with filter material that is not necessarily hydrophobic. Moreover, a desiccant may be in place within the compartment since the infrequent opening of the slit 58 will provide a very long service life for the supply of the moisture-absorbing desiccant.

Figure 5:
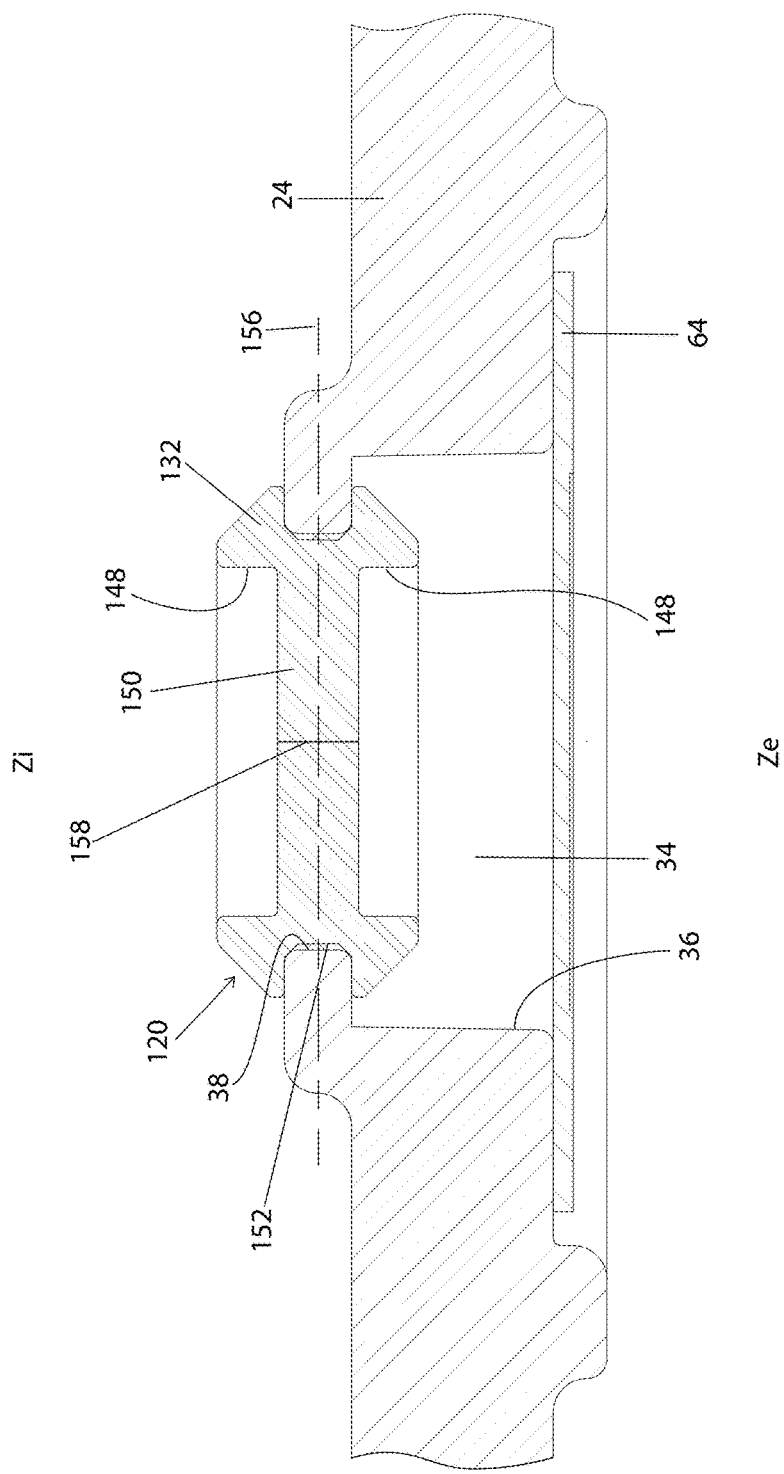
FIG. 5 is a diagram like FIG. 1 but showing an alternative embodiment of the present invention.

FIG. 5 depicts an alternative embodiment 120 of the pressure compensating apparatus. In this embodiment, the seal 132 is smaller than that of the previously described embodiment in that it does not extend into and engage the counterbored portion 36 of the opening 34. Rather, the seal 132 is generally a wheel or disc shaped in cross section (FIG. 5), and symmetrical about the central plane 156 of the diaphragm 150. The seal 132 includes two circular recesses 148 on each side of the diaphragm 150, as well as a peripheral groove 152 that, like the prior-described groove 52, is sized to compressively engage the annulus 38 when the seal is installed. It is noteworthy here that this embodiment 120 can be installed in a simple hole. That is, a hole with no counterbore or other complex features.

The seal of this embodiment also includes a very thin, central linear slit 158 extending through the diaphragm 150. The slit 158 is made prior to or after installation of the seal. Since the diaphragm is centered on the annulus 38 in this embodiment, the compression developed from the annulus and seal engagement applies a slight compressive force that acts across the width of the slit 158 to urge the slit closed.

The pressure compensating operation of this embodiment of the pressure compensator apparatus 120 (flexing diaphragm, slit briefly opening at extreme pressure differentials) matches what was described above in connection with the earlier embodiment, and will not be repeated here.

While the foregoing description was made in the context of preferred embodiments, it is contemplated that modifications to those embodiments may be made without departure from the invention as claimed. For instance, the seal and the shape defined by the annulus need not be circular. An elliptical or other shape will suffice. Similarly, the rib described in the first preferred embodiment may be configured so that compression provided by it is limited to the direction for closing the slit. Moreover, it is contemplated that without undo experimentation, the size of the slit, and the diaphragm size and thickness can be selected or "tuned" for optimal pressure compensation for any given application of compartment volume size, anticipated pressure, the expected environment where the apparatus is used, as well as the fragility of the housing or robustness of the housing water seals.

The invention claimed is:

1. A pressure compensator apparatus for a housing compartment configured for a motorized vehicle, the apparatus comprising:
    a housing wall that has an opening between an interior zone that is inside of the compartment and an exterior zone that is outside of the compartment, the housing wall including an annulus that defines a portion of the opening, and being configured to be supported on the vehicle; and
    a seal engaging the annulus and seated in the opening to seal the opening, the seal including a flexible diaphragm having a normally closed slit therethrough, the diaphragm having a perimeter portion and an internal portion, the perimeter portion surrounding the internal portion, the slit being within the internal portion;
    wherein the seal is configured so that the diaphragm is compressed in a first direction that urges the slit closed when the seal is engaged with the annulus;
    wherein the diaphragm is arranged so that a pressure difference between the interior zone and the exterior zone urges the diaphragm to flex in a direction for opening the slit, thereby to provide a pathway for air movement between the interior and exterior zones, wherein the seal has a first end and an opposing second end, wherein when the seal is sealing the opening and the slit is closed, the first end is substantially parallel to a first plane and substantially faces the interior zone, the second end is substantially parallel to a second plane and substantially faces the exterior zone, and the diaphragm is substantially parallel to a third plane that is intermediate of the first and second planes.

2. The apparatus of claim 1, further including a hydrophobic filter for filtering air that moves through the pathway.

3. The apparatus of claim 1, wherein the seal includes a peripheral groove for receiving the annulus, the groove being sized so that the annulus compresses the diaphragm in the first direction when the seal is engaged with the annulus.

4. The apparatus of claim 1, wherein the opening of the housing also has a counterbored portion adjacent to the annulus, and wherein the diaphragm includes a peripheral rib for engaging the housing in the counterbored portion of the opening, the rib being sized to compress the diaphragm in the first direction when the seal is engaged with the annulus.

5. The apparatus of claim 1, wherein the diaphragm is formed so that the diaphragm does not flex and the slit is normally closed in the absence of a pressure difference between the interior zone and exterior zone.

6. The apparatus of claim 1, wherein the seal is radially compressed at the annulus to seal the opening of the housing wall.

7. A pressure compensating method for a housing that has a compartment configured to be supported on a motorized vehicle, the method comprising:
    forming part of the housing to define an opening between an interior zone that is inside of the compartment and an exterior zone that is outside of the compartment, the housing being configured to be supported on the vehicle;
    sealing the opening with a seal that includes a flexible diaphragm having a normally closed slit therethrough, the diaphragm having a perimeter portion and an internal portion, the perimeter portion surrounding the internal portion, the slit being within the internal portion;
    compressing the diaphragm in a first direction that urges the slit closed; and
    configuring the diaphragm so that a pressure difference between the interior zone and exterior zone urges the diaphragm to flex in a direction for opening the slit thereby to provide a pathway for air movement between the interior and exterior zones,
    wherein the seal has a first end and an opposing second end, wherein when the seal is sealing the opening and the slit is closed, the first end is substantially parallel to a first plane and substantially faces the interior zone, the second end is substantially parallel to a second plane and substantially faces the exterior zone, and the diaphragm is substantially parallel to a third plane that is intermediate of the first and second planes.

8. The method of claim 7, further including filtering air that moves through the pathway.

9. The method of claim 7, further including forming the seal to include a peripheral groove for receiving an annulus part of the housing that defines a portion of the opening, and sizing the groove so that the diaphragm is compressed in the first direction when the seal is engaged with the annulus part of the housing.

10. The method of claim 7, further including:
    counterboring a portion of the opening adjacent to an annulus part of the housing that defines a portion of the opening;
    forming on the seal a peripheral rib for engaging the housing in the counterbored portion of the opening, and
    configuring the engaged rib to compress the diaphragm in the first direction when the seal is engaged with the annulus part of the housing.

11. The method of claim 7, further including forming the diaphragm so that the diaphragm does not flex and the slit is normally closed in the absence of a pressure difference between the interior zone and exterior zone.

12. The method of claim 7, further comprising radially compressing the seal at an annulus of the housing to seal the opening of the housing.

13. The method of claim 7, further comprising:
    providing a peripheral rib on the seal for engaging the housing; and
    compressing, by the rib, the diaphragm in the first direction when the seal is engaged with an annulus part of the housing that defines a portion of the opening.

* * * * *